United States Patent [19]

Sleger

[11] 3,752,415

[45] Aug. 14, 1973

[54] MAGNETIC TAPE TRANSPORT

[75] Inventor: Roger R. Sleger, San Carlos, Calif.

[73] Assignee: Ampex Corporation, Redwood City, Calif.

[22] Filed: Jan. 18, 1971

[21] Appl. No.: 107,066

[52] U.S. Cl. ................ 242/184, 226/118, 242/68.3, 242/198, 274/4 E

[51] Int. Cl.. G11b 15/58, G11b 23/10, B65h 19/02

[58] Field of Search .................... 242/184, 183, 185, 242/182; 226/118, 95, 97; 274/4 C, 4 D, 4 E; 318/6, 7; 179/100.2 P

[56] References Cited

UNITED STATES PATENTS

| | | | |
|---|---|---|---|
| 3,134,528 | 5/1964 | Dickey | 242/182 X |
| 3,454,960 | 7/1969 | Lohrenz | 242/184 |
| 3,311,313 | 5/1967 | Rayfield | 242/184 |
| 3,343,758 | 9/1967 | Hemdal | 242/183 |
| 3,525,481 | 8/1970 | Longland | 242/183 |
| 3,199,800 | 8/1965 | Reader | 226/118 X |

*Primary Examiner*—George F. Mautz
*Attorney*—Robert G. Clay

[57] ABSTRACT

A magnetic tape transport has a pair of tape loop vacuum columns on either side of a capstan and a pair of flanking heads, and the columns are tapered so that with increasing loop length, an increasing cross sectional area of tape is exposed to vacuum, counteracting the drag of the heads, and no pinch roller is needed with the capstan. In fast wind mode, only one of the vacuum columns is used, and a single loop length sensing apparatus controls both reel motors, which are biased such that the supply reel tries to make the loop longer than a desired mean length and the takeup reel tries to make the loop shorter than the mean, resulting in use of the reel motors at fullest capacity without danger of loss of control. An automatic cassette loader is also provided togetber with circuitry adapting the apparatus for automatic high speed recording of cassettes.

18 Claims, 15 Drawing Figures

INVENTOR.
ROGER R. SLEGER

BY

ATTORNEY

INVENTOR.
ROGER R. SLEGER

BY *Robert S. Clay*

ATTORNEY

INVENTOR.
ROGER R. SLEGER

BY Robert H. Clay

ATTORNEY

INVENTOR.
ROGER R. SLEGER

BY Robert G. Clay
ATTORNEY

INVENTOR.
ROGER R. SLEGER

BY Robert G. Clay
ATTORNEY

INVENTOR
ROGER R. SLEGER

BY *Robert G. Clay*

ATTORNEY

INVENTOR.
ROGER R. SLEGER

BY Robert S. Clay

ATTORNEY

INVENTOR.
ROGER R. SLEGER

BY Robert G. Clay

ATTORNEY

MAGNETIC TAPE TRANSPORT

BACKGROUND OF THE INVENTION

This invention relates to magnetic tape transports, and particularly to transports employing tape loop vacuum columns.

Previously in the magnetic tape transport art it has been proposed to automatically load tape cassettes and to thread the tape thereof around a capstan and transducing heads by suitably rotating the cassette reel hubs to feed a loop of tape into the transport while at the same time applying suction or differential air pressure to pull the tape loop into a pair of vacuum columns disposed on either side of the capstan and heads. Generally the vacuum columns are put to conventional use during the operation of the machine for tensioning the tape, and are provided for this purpose with loop length sensing means (e.g., photoelectric) that operate to control the associated supply and takeup reel hubs of the cassette. If a pinch roller is provided it must be retractable to clear the loading and unloading path of the tape. Alternatively, a suction type capstan is sometimes used. One or the other has usually been required because the frictional drag of the tape in movement over the heads and other elements produces an unbalance of tensions upstream and downstream from the capstan with resulting slippage between tape and capstan. Inaccurate metering speed results, unless the extra pinching force is provided to hold the tape unslippably against the capstan.

Also, in the art, the fast wind mode of operation is produced with the same general arrangement as for normal operation, in that each reel is controlled by a different vacuum column and loop length sensing apparatus, although the capstan may not be used. However, in such an arrangement, either there is danger of losing control in that one reel motor overruns the other, breaking tape or throwing loose tape out of the machine; or else motors with capacities much greater than are to be called upon in use, must be provided in order to ensure the reserve power needed to avoid loss of control.

Accordingly, it is an object of the present invention to provide a bidirectional magnetic tape transport of the automatic cassette loading vacuum column type, in which no pinch roller is needed.

It is a further object of the invention to provide a transport as above described, which utilizes the full capacity of the reel motors without loss of control of the tape.

Other objects and advantages will be explained in the course of the following description.

DESCRIPTION OF THE PREFERRED EMBODIMENTS

Figure 1:
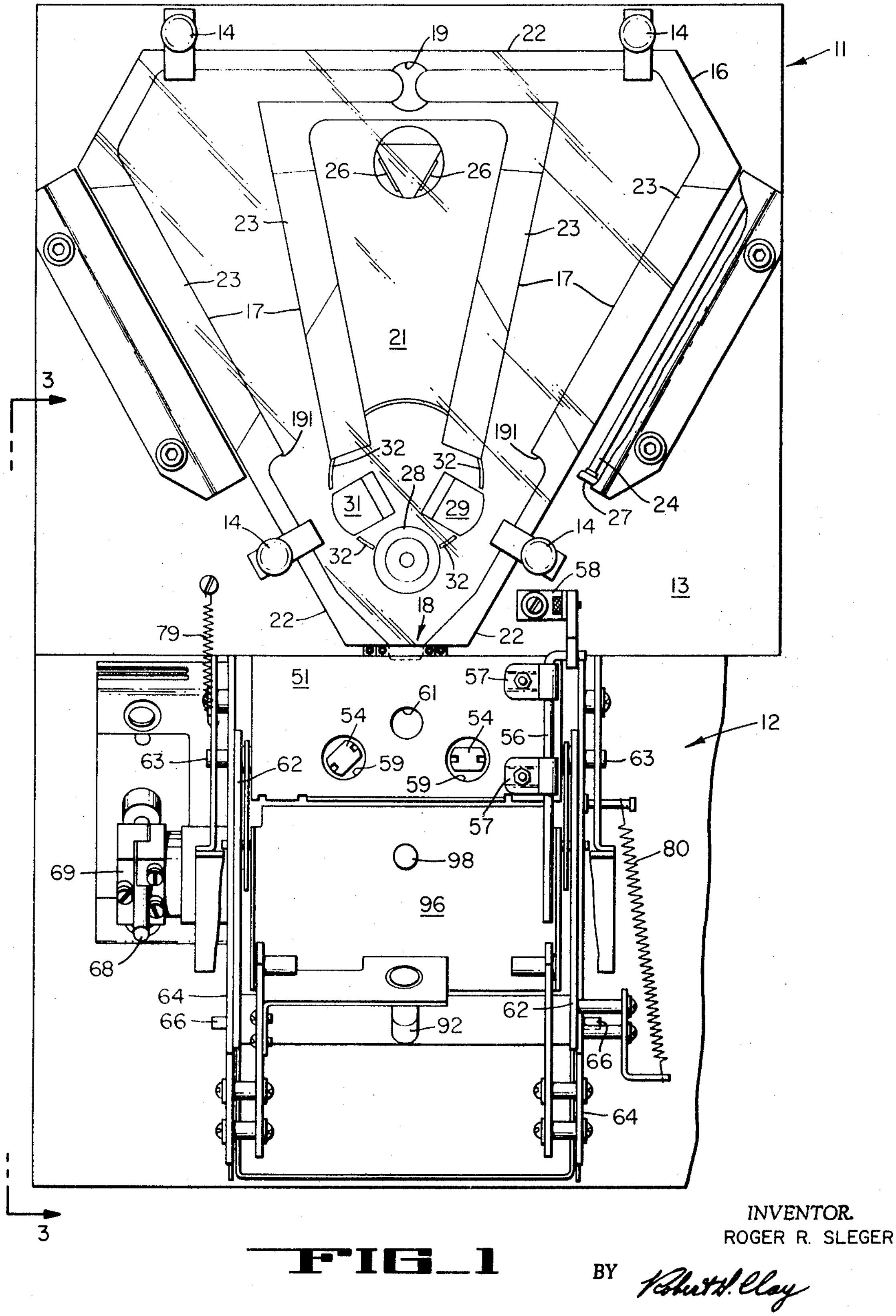
FIG. 1 is a broken-away plan view of a magnetic tape transport in accordance with the invention.

Referring now to the drawing, and particularly to FIG. 1 thereof, there is shown a magnetic tape transport 11 together with a cassette loading and unloading apparatus 12 adapted for receiving and automatically positioning, winding and recording tape cassettes as hereinbelow described.

THE TRANSPORT STRUCTURE

The transport 11 comprises a flat precision top plate 13 on which is mounted, as by means of clamps 14, a glass-and-plastic cover unit 16, shaped to define a pair of tape loop tensioning vacuum chambers 17 having a common tape entrance port 18 and a common vacuum outlet 19. The unit 16 is arranged for easy and efficient manufacture and assembly, as will later be described, but at present it may be said that it is formed with an upper glass cover plate 21, and integrally molded sidewalls 22 of a moldable plastic substance, such as epoxy resin, and containing inset clear glass side windows 23 for the passage of light from a pair of elongated lamps 24 (only one of which is shown) to a pair of tape loop length sensing photoelectric cells 26 mounted on the top plate 11. The lamps 24 are also mounted on the top plate 11 by means of clip mounts 27. A high friction plastic (molded urethane) surfaced capstan 28, a recording head 29, and an erase head 31 are mounted at the junction of the two vacuum chambers, with the heads flanking the capstan, and a ring-shaped partition 32 is supplied to assist in containing the tape loops, although space is left for leakage of air from one chamber 17 to the other, for a purpose later to be described.

THE TAPE LOOP VACUUM CHAMBERS

The above described transport structure is adapted for automatic vacuum assisted loading of tape from a cassette (FIG. 5) of the so-called "Philips" standard type, and accordingly, no pinch roller is provided for the capstan, because a pinch roller would be an obstacle in the tape loading path. The absence of a pinch roller, however, requires that the operating tape tensions be substantially equal on either side of the capstan, so as to avoid tape slippage on the capstan. It is to this end that one important feature of the present invention is directed, which is the tapering of the individual vacuum chambers 17 in a direction diverging away from the tape entrance 18, so that the cross-sectional area, and therefore the tape tension, increases with increasing loop length. This variable tension producing feature is employed in the present invention to compensate for the frictional drag of the two heads 29, 31 so as to balance the tensions immediately upstream and downstream from the capstan, in a manner illustrated in FIG. 2. As shown in this Figure, the downstream or takeup reel loop 36 is longer than the upstream or supply reel loop 37 during normal speed operation because the servo system for each loop (later to be described in detail) has a built-in error common to such systems. Unless the gain of the system is infinite, the tape loop must move away from its null point (38 and 39 respectively) before an error sensing can be made and corrective action taken. In the present apparatus the takeup reel servo causes the takeup reel 41 to operate faster when the loop is too long, as shown, but in normal operation the loop will remain too long by the amount 42; while the supply reel servo operates the supply reel 43 to maintain the supply reel loop 37 too short by the same amount 42. The tension produced in loop 36 below the head 31 is therefore greater than the described null point 38 tension, but is reduced by the frictional drag of heal 31 so that the tension immediately downstream from the capstan is equal to the desired null point tension. Conversely, the tension produced in the shorter loop 37 below the head 29 is less than the desired null point 39 tension, but is augmented by the frictional drag of head 29, so that the tape tension immediately upstream from the capstan 28 is equal to the desired null point tension and to the tension immediately downstream from the capstan. In actual practice, it has been found most convenient to accept the observed drag of the heads, the vacuum level, and the gains of the servo systems, as the predetermined parameters, to observe the length differential 42 produced thereby in the loops, and then to construct the vacuum chambers with a taper that will compensate for the head drag when the loops are displaced as shown. In the present apparatus, this taper was found to be 18′, but different tapers would be suitable for other servo gains and drag parameters. Of course, when the tape direction is reversed, the longer loop will be on the left (FIG. 2) and the shorter on the right, but the drag of the heads will also be reversed, and the tensions immediately upstream and downstream from the capstan will still be equal. Thus it is seen that the taper of the chambers is particularly effective in bi-directional operation, as for enabling the capstan to drive the tape in either direction, without slippage, even though no pinch roller is provided.

THE CASSETTE LOADING STRUCTURE

Referring now to FIGS. 1 and 3–5, the structure is shown for automatically positioning the cassette and loading tape into the vacuum chambers. Confronting the vacuum chamber entrance 18 is a cassette holding rack 51 mounted for moving from the plane of the transport (FIG. 4) to a tilted-up position (FIG. 5) for receiving the cassette 52. The tilting action is convenient for fitting the cassette reel hubs 53 snugly onto, and removing them from, a pair of tape reel rive spindles 54. For the tilting action, rack 51 is mounted for sliding motion on a guide rod 56, as by means of a pair of sliding-journal brackets 57. The rod 56 is then hinged for pivoting motion in a pivot-journal bracket 58 affixed solidly to a block on the top plate 13. The rack 51 has appropriate openings 59 for passage of the spindles 54, and also a central opening 61 for a purpose later to be described. For causing the tilting and sliding action, a pair of side links 62 are pivoted at one end by pins 63 that extend laterally from the forward portion of the rack 51, and the other ends of the links 62 are pivoted to the framework 64 of the machine, as by means of pins 66. A motor 67 raises and lowers the rack by driving a shaft 68 through a helical drive journal 69 that is pivoted to one of the links 62. The shaft 68 and journal 69 may be helically threaded to provide such action, but as here shown, the shaft 68 is smooth, and the journal 69 is of a well-known commercially manufactured type termed a "linear actuator" and sold under the trade name "Rohlix" by the Barry Controls Co., Watertown, Mass. The actuator 69 contains ball bearings arranged so that rotation of the shaft 68 drives the actuator one way or the other on the shaft 68, depending on the direction of rotation of the shaft 68, and yet if the actuator is given a push, or meets undue resistance, the linear motion yielding reverses or stops without requiring a reversal or stopping of the motor 67. With a helically threaded arrangement, the threads might be stripped under such circumstances.

THE LOADING MOTOR

One of the advantages in using the linear actuator as above described lies in the fact that the loading mechanism is intended for use in cassette duplicating machines located in public or semi-public places, such as schools, and to be operated by inexperienced persons, some of whom may even be motivated to tamper with or damage the machine. Other features of the structure are also adapted to protect the machine against mishandling. The motor 67, for example, is mounted in a double shock mounting structure that permits a certain limited pivoting of the shaft 68 as the rack 51 tilts between its up and down positions. First, by a flange 71 extending from the motor housing, together with a set of bolts and spacer sleeves 72, the motor is mounted in a plate 73, which in turn is slung beneath a bracket 74 by means of a set of rubber shock mounting grommets 76. The bracket 74 is in turn mounted on a framework element 77 by means of rubber shock grommets 78. The shock mounting arrangement provides the additional convenience that it is adapted for automatic sensing of the arrival of the cassette rack 51 in either up or down position, or in a jammed intermediate position requiring automatic corrective action, as by means of a pair of micro switches 81 and 82 that are solidly mounted on the bracket 74. The switch 81 is termed the "down" or "SWD" switch, and it is operated by the plate 71 whenever the apparatus jams in a downward moving mode of the cassette rack 51. The switch 82 is termed the "up" or SWU" switch, for it is operated by the plate 71 whenever the apparatus jams in an upward moving mode of the cassette rack 51. Arrival of the rack 51 in either the correct "up" or correct "down" position produces such a jamming operation of the appropriate switch, and jamming operation is also produced by intermediate interferences, such as manual interference, or jamming because of incorrect insertion of the cassette, or of another object. As will be later seen, operation of either switch 81, 82 first stops the motor 67, and then automatic corrective action follows, if such is needed. To reduce the load on the motor, the loading structure is counterbalanced by a pair of springs 79 and 80.

THE COVER FOR THE CASSETTE SLOT

Figure 3:
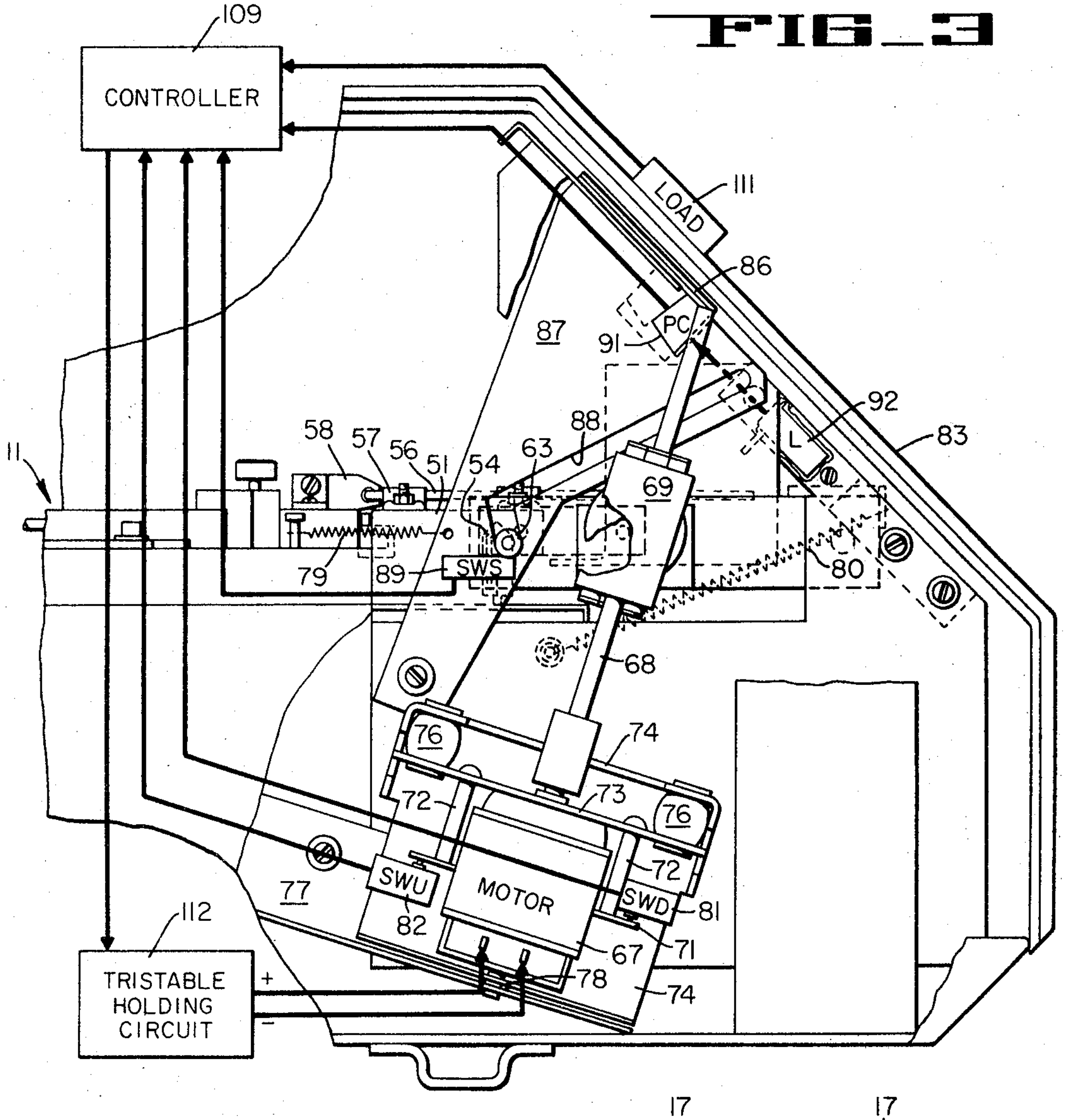
FIG. 3 is a side elevation view on the plane of lines 3—3 of FIG. 1.
Figure 4:
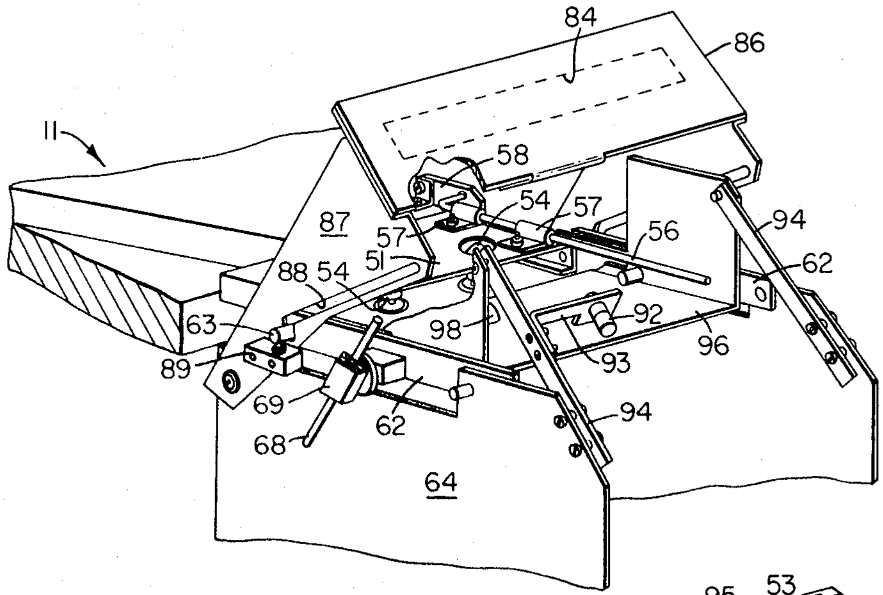
FIG. 4 is a perspective view of a portion of the apparatus of FIGS. 1 and 3.

The machine in finished condition is enclosed in a tamper-proof housing 83 (FIG. 3), and access for the insertion and removal of cassettes is solely through a slot 84 shown in dashed lines in FIG. 4. The slot 84 is closed, in the down position of the rack 51, by means of a pivoting slot cover 86 mounted on a pair of arms 87 pivoted to the framework 64. For uncovering the slot 84 in the up position of the rack 51, the pins 63, extending from the rack and through the links 62, are arranged to slide in a cam-follower slot 88 in each of the arms 87. Also mounted on one of the arms 87 is a "seat" or "SWS" microswitch 89, which is operated by the pin 63 in the down position of the rack 51, as an aid in determining whether corrective action is needed when the SWD switch is operated, as will be further explained below.

THE CASSETTE SENSING PHOTOCELL

As a further sensing device for operation of the control logic, a photocell 91 and operating lamp 92 are mounted, the photocell on a bracket beneath the slot cover 86, and the lamp on a portion 93, 94 of the framework, so that the lamp illuminates the photocell through the opening 61 in the rack 51 (FIG. 5) when the rack is up and no cassette is in the rack. As will be seen below, the logic questions the status of the photocell only in the rack-up position, so an absence of photocell signal in this position indicates that a cassette or some other object has been loaded into the rack. The window 95 of the cassette is not normally in line with opening 61.

THE DUMPING TRAY

As an additional safeguard against misuse, there is provided a tilting tray 96 for receiving loose objects other than cassettes that may be inserted, and for dumping them into a hopper (not shown) beneath. The tray 96 is pivoted at the ends of framework arms 94, and is operated by a pair of links 97 (FIG. 5) coupled to the pins 63. The bottom of tray 96 has an upstanding ogive pointed stud 98 formed thereon for assisting in positioning the cassette in the down position. As the cassette in rack 51 descends so that the hubs 53 fit over the spindles 54, the sloping side of the stud 98 engages the edge of the cassette and forces it into snugly fitting relation against the portal of transport opening 18, providing that the cassette was properly oriented in the rack 51 to begin with. If the cassette is inserted endwise instead of edgewise, however, then the point of stud 98 solidly engages the cassette side and prevents seating of the cassette or further downward movement of the rack 51. This is a jammed condition in which the SWD switch 81 is closed, but not the SWS switch 89, so corrective action is automatically taken. Likewise, if the cassette is inserted edgewise but backward, with the exposed tape run facing away from rather than toward the transport, then in such case the cassette likewise does not seat properly on both the spindles 54 and the stud 98, and a jam condition is signalled.

THE TAPE REEL DRIVING SPINDLES

Figures 5, 6:
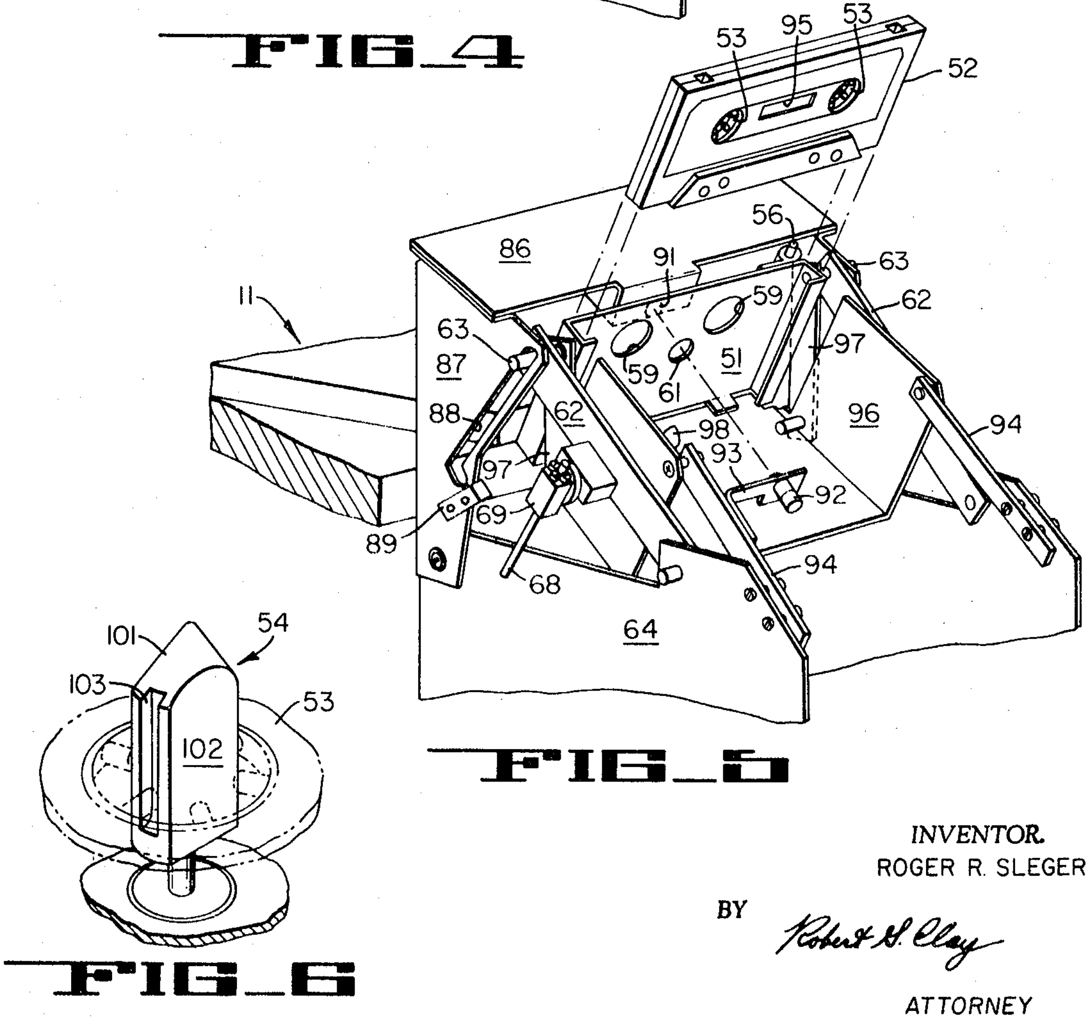
FIG. 5 is a perspective view similar to FIG. 4 showing the apparatus in a different operating mode.
FIG. 6 is a broken-away enlarged perspective view of a portion of the apparatus of FIGS. 1–5.

To ensure correct engagement of the six teeth of the standard cassette hub with the spindle 54, the spindle is formed as shown in FIG. 6, with a conical tip 101, cut away in planes parallel to one another and to the spindle axis to define a pair of flat sides 102, and having a pair of axially directed grooves 103 centralized between the faces 102. In addition, the reel motors are pulse operated during the loading process to vibratingly rotate the spindles, as will be described below. This structure has been found in practice to nearly invariably engage the cassette hubs without jamming. In the event a jam occurs, however, the apparatus is programmed to back off and try again and to "worry" the cassette, so to speak, until it reaches a fit on the spindle, as also will be further described below.

THE LOADING LOGIC

The programming of the apparatus to operate properly under varying conditions is arranged as shown in FIG. 3 by means of a controller 109, which is substantially a programmed array of standard logic elements, and may in fact be represented by any of a number of general purpose digital computers of the present art, suitably programmed to perform the functions described below. To assist in the performance of these functions, there are also provided a manually operable load button 111, which is coupled along with the switches 81, 82 and 89 to present binary signals, represented as "0" for "off" or "open" and "1" for "on" or "closed", to the controller 109; and a tristable holding circuit 112 controlled by the controller and having a "+" condition for operating the motor upwardly, a "−" condition for operating the motor downwardly, and a zero position in which the motor is stopped. The expression "0, 1" means that it does not matter what signal is present. The controller is programmed to provide the following functions:

TABLE I

| Mode | Load 111 | SWD 81 | SWU 82 | TSH 112 | SWS 89 | PC 91 | Controller 109 BSH | Controller 109 REC | Controller 109 Stop | Remarks |
|---|---|---|---|---|---|---|---|---|---|---|
| STANDBY | 0 | 1 | 0 | 0 | 1 | 1 | 0 | 0 | 0 | Standing-by. |
| LOAD | 1 | 1 | 0 | + | 1 | 1 | 0 | 0 | 0 | Begin up move. |
| UP | 1 | 0 | 0 | + | 0 | 0,1 | 0 | 0 | 0 | Cont. up move. |
| $\overline{\text{LOAD}}$ | 0 | 0 | 0 | − | 0 | 0,1 | 0 | 0 | 0 | Load button off. |
| LOAD | 1 | 0 | 0 | + | 0 | 0,1 | 0 | 0 | 0 | Load button on. |
| JAM | 1 | 0 | 1 | 0 | 0 | 0,1 | 0 | 0 | 0 | Jam on way up. |
| UP | 1 | 0 | 0 | + | 0 | 0,1 | 0 | 0 | 0 | Jam cleared. |
| TOP | 1 | 0 | 1 | 0 | 0 | 1 | 0 | 0 | 0 | Ready. |
| TOP | 1 | 0 | 1 | 0 | 0 | 0 | 1 | 0 | 0 | Cass. inserted. |
| DOWN | 0 | 0 | 1 | − | 0 | 0,1 | 1 | 0 | 0 | Start down move. |
| DOWN | 0 | 0 | 0 | − | 0 | 0,1 | 1 | 0 | 0 | Cont. down move. |
| JAM | 0 | 1 | 0 | + | 0 | 0,1 | 1 | 0 | 0 | Jam on way down. |
| DOWN | 0 | 0 | 0 | − | 0 | 0,1 | 1 | 0 | 0 | Jam cleared. |
| BOTTOM | 0,1 | 1 | 0 | 0 | 1 | 1 | 1 | 1 | 0 | Record mode. |
| STOP | 0,1 | 1 | 0 | 0 | 1 | 1 | 1 | 1 | 1 | Stop mode begins. |
| EJECT | 0,1 | 1 | 0 | + | 1 | 1 | 1 | 0 | 1 | Record mode ends. |
| EJECT | 0,1 | 0 | 0 | + | 0 | 0,1 | 1 | 0 | 1 | Ejection move up. |
| EJECT | 0,1 | 0 | 1 | 0 | 0 | 0 | 1 | 0 | 1 | Ejection at top. |
| DOWN | 0 | 0 | 1 | − | 0 | 1 | 0 | 0 | 0 | Cassette removed. |
| DOWN | 0 | 0 | 0 | − | 0 | 0,1 | 0 | 0 | 0 | Return standby. |
| STANDBY | 0 | 1 | 0 | 0 | 1 | 1 | 0 | 0 | 0 | Standing-by. |

In the above table, the controller 109 is further defined as including a BSH bistable holding circuit (not shown in the drawing) which comes on when the cassette is inserted and the light beam to the photocell 91 is interrupted with the rack 51 in the upper position and the SWU switch 82 conjunctively closed. The signal or absence of signal from the photocell 91 has no effect unless the SWU switch 82 is closed. The controller BSH circuit being on, the conjunctive closing of the SWS switch 89 at the bottom position causes the controller to put the machine in REC or record mode, feeding tape into the transport and winding and recording it. During record mode, the load button 111 is bypassed. If the operator wishes to interrupt the recording process, he must push a stop button 121 (see FIG. 7), which initiates a STOP mode also indicated in the Table as automatically initiated by the controller at the end of the recording process, or under various emergency conditions such as broken tape, tight tape, and end of tape with incomplete recording, in which cases an "incomplete transfer" light 122 is energized as a warning to the operator. During the STOP mode, the cassette reel driving spindles and motors are operated to withdraw the tape for the transport, and when the tape is clear of the transport, the end of the record mode is signaled, to initiate ejection of the cassette. When the cassette is removed from the rack 51, the STOP mode ends and the rack returns to standby mode with control restored to the load button 111 for a subsequent loading operation.

THE RECORD LOGIC

Figure 7:
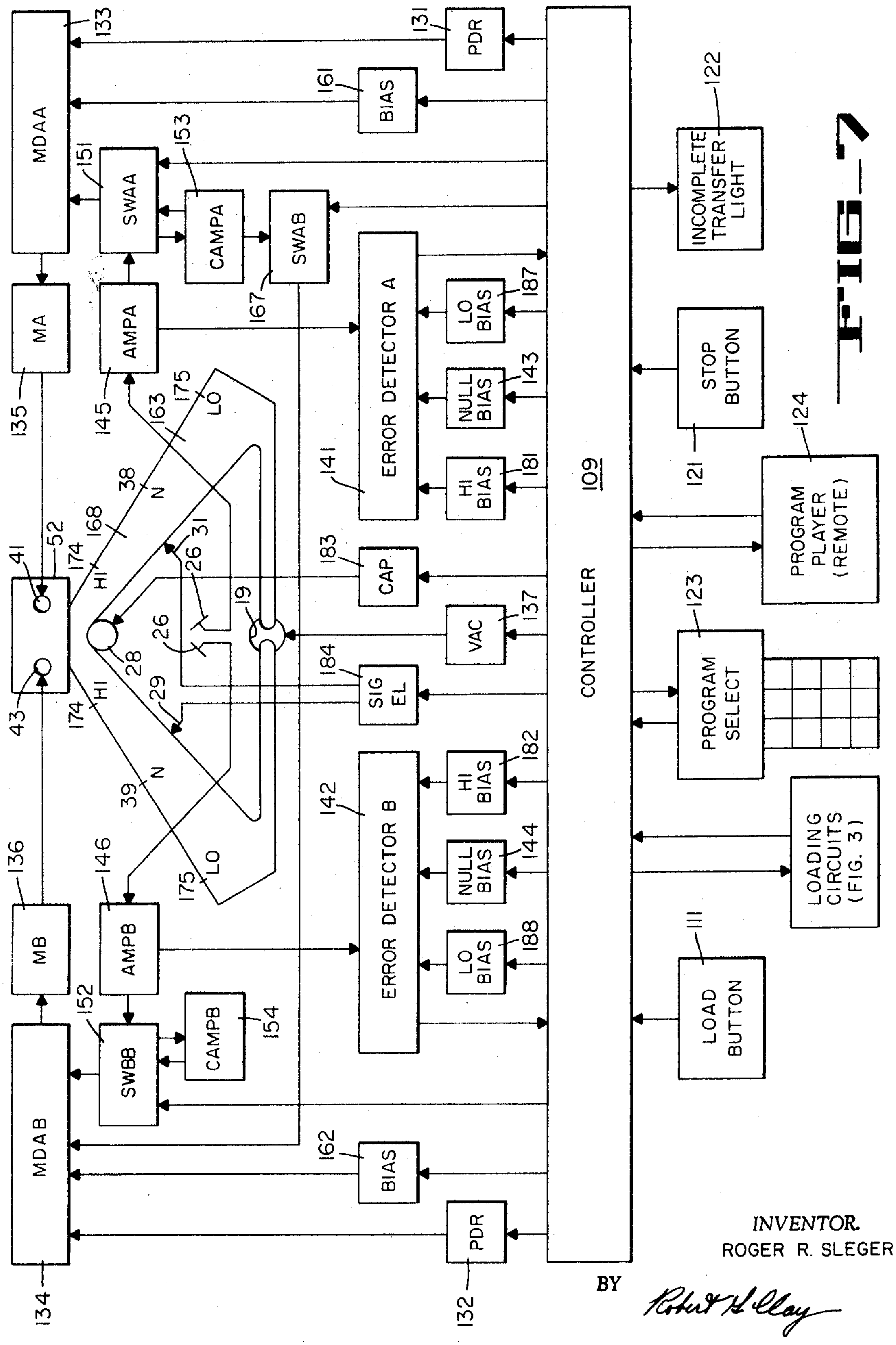
FIG. 7 is a block diagram of a system employing the structure of FIGS. 1–6.

Referring now to FIG. 7, the controller 109 is again seen in relation to the above described loading circuits of FIG. 3, and also in relation to the circuits required for winding and recording the tape. Having operated a program selection control 123, which causes the controller 109 to prepare a remote program player 124 for transmission of a recorded audio program, the operator presses the load button 111 and loads his cassette. The cassette being in position at the entrance 18, and the SWD 18, SWS 89 and BSH circuits being conjunctively on, as well as a ready signal from player 124, the controller 109 causes the operation of a pair of conventional pulse driver circuits 131 and 132, which are coupled to respective motor drive amplifiers 133 and 134 to pulse drive respective conventional reel motors 135 and 136. A sharp 5-second pulsed D.C. voltage is applied to the supply reel motor 135 to engage both reels with their reel holders, to remove all the slack from the tape in the cassette to enable positive control of the tape when processing begins, to insure that there is a sufficient amount of tape on the reel that must load tape into the vacuum chamber, and to insure that if the cassette has any clear leader attached to the supply reel (6 to 18 inches of stiff leader is found on the ends of nearly all standard cassette tapes), no attempt will be made to load this leader. The stiff leader is not well defined in either thickness or width, so it has been found best to not deal with this variable at all. The motor speed is controlled by varying the pulse width. A 40 pulse-per-second frequency is used. The motor power is limited and controlled by varying the pulse amplitude. Too much motor speed will cause the motors to damage or break the tape since the rotational inertia forces transferred to the tape at the time all slack is removed will be too high. After slack is removed, too much motor power will tend to stretch or break the tape due to the high motor torques.

Vacuum supply 137 is then coupled to the chambers, and the reel motor 135, which will become the supplier of tape during the fast wind, is slowly pulse D.C. driven to feed tape into the vacuum chamber. A conventional positive displacement pump and low air capacitance system is used such that a high vacuum is created when leakage is low as is the case when loading. Since the inlet guide cross-sectional area is small, a high vacuum is required if tape is to be reliably pulled out by the vacuum. At the same time the supply reel is being pulsed, a similar but lower power pulse D.C. is applied to the tape-up reel motor 136. This low power pulse drive moves the take-up reel leader away from the inlet guide, when it is in front of the guide, to eliminate tape loading problems associated with the take-up reel. The motor is given only enough power to pull the leader out of the way. As tape from the supply reel starts loading into the chamber, due to the vacuum, friction around the inlet guide and capstan sJops the takeup reel, allowing the supply reel 41 to continue filling the chamber with tape. When the tape loop raches the capstan which is molded urethane plastic, it is held against the surface and cannot slip relative to the capstan. As a result, the loop loads only into one vacuum chamber, the one that reel motor 135 is supplying tape for.

As tape is being loaded into the vacuum chamber, a first conventional error detection circuit 141, 143 monitors the D.C. voltage output of the servo electronics belonging to the motor 135 that is feeding tape. When the tape loop reaches null point 38, the error detector circuit monitors zero D.C. volts (no error), and the controller 109 switches the pulsed D.C. off and the servo control (see below) on for the supply motor 135. At the same time, the take-up reel motor 136 is connected with its servo (below), which derives its error signal from the same photocell as the supply servo; and fast wind begins.

FAST WIND MODE

Figures 2, 8:
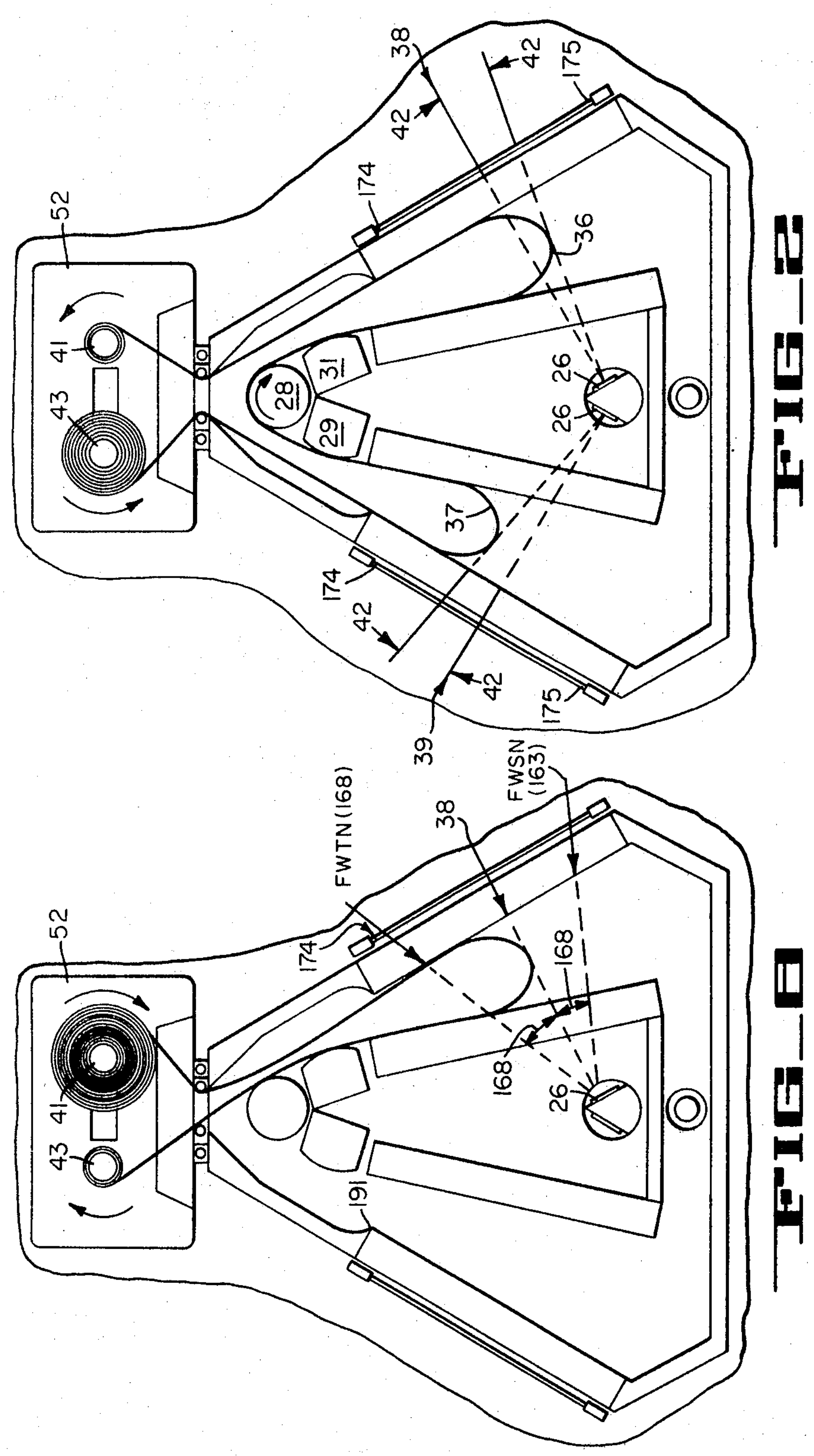
FIG. 2 is a schematic plan view illustrating an operating mode of the apparatus.
FIG. 8 is a schematic view similar to FIG. 2, showing the apparatus in a different operating mode.

Initiating the fast wind mode, controller 109 couples the signal from supply reel side A phtocell 31 and the A side amplifier AMPA 145 through a switch SWAA 151, thence to an A-side compensated amplifier CAMPA 153, thence back through the switch SWAA 151 and to the input of A-side motor drive amplifier MDAA 133. At the same time, a bias 161 of conventional design is applied to MDAA 133 to cause the A-side (supply) motor to try to feed the tape loop toward a biased null point FWSN 163 (FIG. 8) at greater tape loop length in the vacuum chamber than the medium length record mode null point 38. Also (FIG. 7) the supply side sensing output from CAMPA 153 is applied through an AB switch SWAB 167 to the input of the B-side motor drive amplifier MDAB 134, which is given an opposite bias 162 of conventional design so as to attempt to drive the loop toward a shorter-than-null point FWTN 168 (FIG. 8). As a result, the tape loop in fast wind stays normally near the null point 38, but the motors are operated at the fullest capacity consistent with maintaining control. The operation may be further described as follows.

Fast wind is unique since both reels are servo controlled by a single mechanical circuit (one lamp, loop of tape and photocell). If the zero error position of the tape for one servo circuit (supply) were also the position of zero error for the other servo circuit (take-up) the reel motors would simply maintain the tape at this position until a disturbance occurs. A tape loop position disturbance in the form of a fixed zero position offset (angle 168, FIG. 8) is applied such that when one servo has zero error, the other has very large error. This fixed offset forces one reel to turn very fast (the reel that sees a large error) and the other reel to follow. The benefit derived from this scheme of fast winding is that the speed varies as the ability of each reel to respond varies. This means that the motors themselves decide how fast they can supply or take up tape. If one motor encounters excessive loading problems, due to friction generated in the cassette, for example, it will slow down as dictated by its torque speed curve and the other reel must also slow down to match its tape speed. Although speed would reduce under high loading (due to the torque vs. speed characteristics of the motor), it should be noted that control of the tape is not reduced. An example of the excellent control resulting can be demonstrated by disconnecting one reel motor while in fast wind (over 200 ips). The other motor will immediately proceed to reposition the tape loop to its zero position as the tape comes to a stop.

Previous fast wind schemes for vacuum transports have generally relied on servo control of tape position in each of two vacuum chambers, while speed was determined by the capstan surface speed. Such an arrangement is not a completely closed loop system since the capstan speed determines tape speed, and does so independently of the torque required at the tape reels. The reel motor must then have a large reserve of power, or it may lose control of the tape under high loads. The capstan speed cannot be the top speed of the reel motors since at that speed there is no possibility for either increased friction in the reel (needs more power, but reel is already at maximum), or reduced friction (needs more speed, but reel is already at or near top speed). The result in either case is that the reel loses control. Therefore, the capstan must allow for a slower fast wind; so that in the event of a power requirement change at the reel, that motor would have enough reserve power to be able to correct for the change in load. In practice, it has been found that this reduced speed must be greatly reduced when the system is applied to cassettes since they vary greatly in frictional characteristics. And, even then, all that can be done is to reduce the possibility of losing control. The possibility, however, is never entirely removed. One solution to limited power would be simply to use more powerful reel motors. This solution requires larger motors and amplifiers which in themselves might be acceptable; but large motor inertia is not. A high-speed tape system must be able to respond very fast, and large motors generate problems in this respect. Also, as applied to cassettes, a motor of less than 1.66 inches in diameter is desirable since only motors under this size can direclty drive the cassette reels. The advantages of the offset servo wind technique are: (1) it allows the reel motors to determine their own speed resulting in a true closed loop performance; (2) the actual wind speed is, in a sense, agreed upon by both motors, where either one may be working at its maximum while the other is following; the error is mechanically fixed; and no matter how hard the motors try, they cannot possibly reduce this error; they can only divide the error between them, and this automatically happens via their torque-speed characterstics; (3) the new fast wind mode allows use of smaller, lower-inertia motors, which can be less than 1.66 inches in diameter and can therefore directly drive the cassette reels; the low inertia capability is of even greater importance in the end-of-tape mode (below); (4) since this offset servo fast wind system is a true closed loop system, and does not depend upon any capstan; and magnetic head to tape contact is neither required nor desired, the vacuum in the chamber during the fast wind process can be reduced. This reduction in vacuum is designed into the transport by deliberate leakage of air around the tape that comes out of the vacuum chamber as it crosses the magnetic head, capstan and the space between the capstan and inlet guide.

Figures 9, 10, 11:
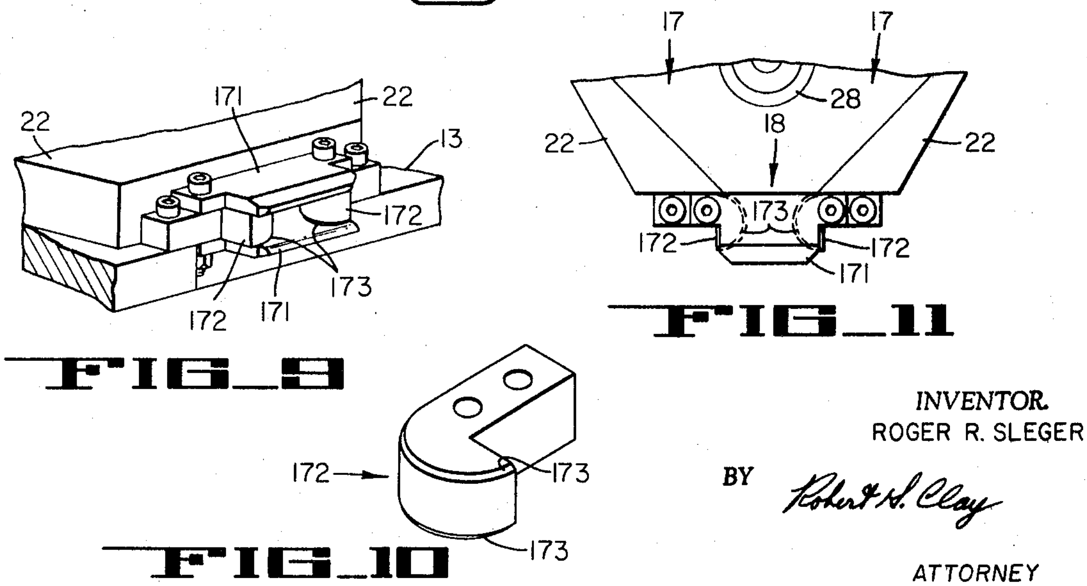
FIG. 9 is an enlarged perspective view of a portion of the apparatus of FIG. 1.
FIG. 10 is a further enlarged perspective view of a portion of the apparatus of FIG. 9.
FIG. 11 is a plan view of the apparatus of FIG. 9.

The arrangement for air leakage is best illustrated in FIGS. 1 and 8–11. In FIG. 1 it will be seen that there is more leakage past the edges of the longer tape segment extending from entrance 18 to capstan 28 and past head 31 than around the edges of the shorter looped tape segment between the walls of the vacuum chamber, when the tape is disposed as in FIG. 8. Also, as shown in FIGS. 9–11, the portal 18 is defined by a pair of threshold plates 171 bracketing a pair of curved tape guides 172 that have bevelled edges 173, such that atmospheric air passes freely between the tape and the bevelled portions 173 of the guides whenever the tape loops are not touching the outer side walls 22 of the vacuum chambers; and even when the tape loops are in position to touch side walls 22, the air flowing through the bevelled portion 173 provides an air bearing effect between the tape loops and the vacuum chamber side walls. Since in the condition shown in FIG. 8, the loop is entirely in the A-side chamber, it follows that more air is leaking through the B-side guide 172 bevelled portions 173 than through the bevelled portions on the A-side.

This deliberate air leakage provides an additional benefit to be explained under end-of-tape sensing (below). The immediate benefit of vacuum reduction is significantly increased speed in the fast wind mode. The speed is now at the point that air film bearing effects are provided at the head, capstan and inlet guide. This is desirable since wear is eliminated on the head and capstan during fast winding of tape. The resulting tension in the tape is approximately 1.5 oz. and, of course, is substantially constant from start to end of reel. (5) a fifth benefit of the offset servo fast wind is its usefulness in sensing the end of tape in cassettes.

SENSING END OF TAPE

Just prior to sensing end of tape, the cassette reels are normally turning at extremely high rotational speeds. The only exception occurs if one is already near the end of tape when going into fast wind, in which case the reels may not have accelerated to full speed. The end-of-tape sensing is the same as at high speed; but since the motor speed is less than normal, it becomes easier to control. The biasing introduced into the servo for the fast wind process is done in such a way as to keep the normal tape position during fast wind low in the vacuum chamber (between positions 163 and 168 in FIG. 8). Keeping the tape low provides a longer buffer chamber when the end of tape is reached and allows a fixed, higher position 174 in the chamber to be set such that when the tape reaches this position, we may conclude there is no more tape to supply. This point is just slightly above the biased point 168 of the take-up servo amplifier. This end-of-tape position 174 is identified at the output of the servo, for the reel motor nearest the vacuum chamber being used, as a D.C. voltage. When the tape is at any other position in the vacuum chamber, the servo has a different D.C. output voltage.

At the very instant the end of tape is reached, the supply reel 41 is empty but, of course, keeps turning as though it were not empty. The result is that the supply reel 41 starts winding tape up backwards and begins pulling tape out of the vacuum chamber. The take up reel 43 is also removing tape at the same speed as the supply, so the net result is an extremely fast removal rate. When the tape reaches the fixed D.C. end-of-tape point 174, the motors are electronically disconnected from the servos; and the supply motor 135 (now out of tape) is electrically braked to a stop while the take-up motor 136 (now full of tape) is pulsed D.C. so as to load the second vacuum chamber. The switching is accomplished electronically to eliminate large time delays, as the reels are turning very fast and must be brought to a stop in less than one more revolution. The motor drive amplifiers 133, 134 have extremely low output impedance and high frequency response such that the switching and stopping time are minimum. A low inertia reel motor is a requirement in this instance as the inertial power of the motor must be dissipated as quickly as possible after sensing the end of tape. The reel motors are permanent magnet type and must withstand the shorting treatment called "plugging." As previously mentioned, the motor 136 that has been acting as the take-up until end of tape was given a pulse D.C. voltage such that it loaded the second vacuum chamber. This loading actually could not occur if the vacuum had not been reduced for fast wind by leaking around the head, capstan and space between the capstan and inlet guide assembly. A loop of tape down one vacuum chamber would prevent loading the second vacuum chamber since there is no wrap on the capstan nor any tendency for the tape to stick to it. The tape would just slip past and feed into the wrong chamber. But if the intentional leak is applied, as is the case, then when the tape actually stops, the air film bearing fails and the tape is held to the capstan and head due to the vacuum. This acts as a sufficient brake to allow loading of the second vacuum chamber.

When the tape reaches the mid-point 39 of the second vacuum chamber [as determined by another conventional error detection circuit 142, 144 (FIG. 7)], the pulsed D.C. is removed from the motor 136; and it is connected to its servo which now derives its error from this second ("B side") vacuum chamber, lamp and photocell 26. The motor 135 of the reel that ran out of tape is kept shorted until the tape in its vacuum chamber also crosses its mid-point 38 as monitored by the error detection circuit 141, 143. This crossing typically occurs when the capstan begins rotating, as the machine begins recording; but it may also occur as the machine is going through the end-of-tape processing. When both vacuum chambers are loaded, the vacuum is automatically increased due to the structure of the deck and creates approximately 2.3 oz. of tape tension.

PREPARING FOR RECORD

The controller 109 sends out a signal indicating that it is ready to record. The reproducing device 124, not a part of the present invention, when prepared to reproduce, sends a return signal to the controller 109; and recording begins at 75 ips.

RECORDING

Recording in the cassette duplicator is initiated, as noted above, upon receipt of the proper signal from the eternal reproducer 124. The capstan motor 183 and the erase and record electronics 184 are activated. Two further conventional error detection circuits 141, 187 and 142, 188 are also introduced, for initiating a stop mode if the tape breaks, as by a sensing of loop length at low points 175 of the vacuum chambers.

As was noted in the description above, a true closed loop does not exist when tape is in each vacuum chamber and controlled by each reel since each reel has a definite limitation in the power it may deliver. Many of the lower-quality, and some of the high-quality cassettes, have greatly varying internal friction. Occasionally at the record speed of 75 ips a motor actually loses control. Correction cannot be made because the motor simply has not any more reserve power, so the next best thing is done, which is to keep the tape from breaking. Unless the controller can identify the problem and proceed immediately through the stop sequences, a broken tape will surely result. In addition, when the controller identifies an error of this type, it indicates the error to the user in the form of a red light 122 on the front panel near the cassette loading hole. This informs the user of the machine that he did not get a complete transfer of program material from the external reproducer to his cassette. Another possibility exists that can cause an incomplete transfer of program. This is when the user attempts to record a program longer in length than his cassette tape. In this case, the cassette duplicator runs out of tape before the program is over. The controller interprets this error just as though the cassette went tight, since in either case the tape leaves the vacuum chamber.

The actual logic of the two detection circuits is as follows: one conventional error detector 142, 182 monitors the D.C. voltage at the output of the reel servo that is feeding tape into the vacuum chamber (position 174 on the B side). This voltage corresponds to a tape position that is high, or near the tape heads, in the B chamber. Therefore, if the motor is unable to supply enough tape to keep up with the capstan (cassette friction becomes high or cassette runs out of tape), the tape will tend to leave the chamber. When it reaches the preset D.C. error circuit point 174–B, the controller 109 correctly concludes that it can no longer maintain control and begins the stop sequences along with activating the error light 122. The second conventional error detector 141, 187 monitors the D.C. output of the reel servo that removes recorded tape from the vacuum chamber (position 175 on the B-side). In this case, if motor power is not enough to correct for a change in cassette friction, the tape must move down in the vacuum chamber. It moves down because the reel cannot keep up with the capstan, and an excess of tape is left in the chamber. The D.C. voltage this A-side error detector 141, 187 becomes activated at, corresponds to a low position 175 of tape in the chamber. There is only one position the tape may be in to cause the reel servo output to be the preset D.C. value.

STOPPING

The final operation is the stop sequences. When the cassette duplicator is given a stop command from the high-speed reproducer 124, from an external source, or from one of the two error detector circuits, the servos are immediately disconnected; and the reel motors are pulse D.C. driven to bring the tape back into the cassette. The capstan is stopped; but because of its high inertia, continues to rotate as it decelerates. After a fixed time delay, the tape is assumed to be back inside the cassette. The automatic loading mechanism then returns the cassette to the user of the machine through the loading hole. The loader holds the cassette until it is removed, as determined by the lamp 92 and photocell 91, at which time the loader automatically returns to its normal, down position; and all logic history is removed in preparation for a new cycle.

If an error was detected in record, the red error light 122 would have been lighted when the error was detected and remains on until the logic is reset after cassette removal. power is not turned off in the system since some components such as the servo lamps yield higher reliability if left on. The vacuum system is turned off. A fan cooling the vacuum pump is always left on since there is considerable heat to remove from the pump between cycles.

REWIND-RECORD SEQUENCE

It has been mentioned that the fast wind mode of the present cassette recorder is programmed to be first in sequence, with the recording mode coming second. The primary reason for this seuqence is to ensure that the inserted cassette starts the recording mode with the tape substantially entirely wound upon only one of the reel hubs, so that maximum use of the tape is achieved, as would not be the case if the apparatus haphazardly accepted the cassette with the tape stored equally on both reel hubs. With such a sequence, the recording must be done in reverse, in order to leave the cassette, when recording is completed, at the beginning of the recorded program without requiring another fast wind or rewind mode. Fortunately, the remote program reproducer 124 with which the present structure was adapted to cooperate, also has operating requirements dictating that its reproduction of the program shall be in reverse order. However, a problem arises when the desired program is considerably shorter than the tape can accommodate. Since the mode-changing signal is an end-of-tape (or beginning-of-tape) signal, a forward fast wind to end of tape followed by a reverse recording which fills only, say, two-thirds of the tape, would leave the beginning of the program one-third of the tape length from the beginning of tape. To deal with this problem, the preferred solution is to program the controller 109 for (1) fast wind in reverse to beginning of tape; followed by (2) high speed forward, without recording, for a measured time period equal to the high speed reproduction time of the selected program; followed by (3) high speed recording mode in reverse to beginning of tape, which is also beginning of program.

Of course, it will be understood that the heads 29, 31 could be arranged to include reproducing heads, and that with the addition of appropriate reproducing circuits, the selected program could be directly reproduced on the transport 11. It has been demonstrated in practice that such a transport, equipped with vacuum columns, can reproduce cassette recordings to the flutter and wow standards of high-fidelity equipment. There is, however, a problem associated with the audible noise generated by the operating vacuum system, which requires that the reproducing earphones or speakers be isolated from the transport, either by remoteness, or by booth or other sound proofing of conventional types.

VACUUM CHAMBER COVER DESIGN

A specially designed epoxy-glass cover 21 is used on the cassette duplicator. Aside from a great cost reduction over machining the chamber profile to the tolerances required, the following design advantages are obtained. Although some masking may be needed to prevent spurious operation of the photocells 26, the top of the cover is plate glass which allows one to visually inspect the machine operation as well as adjust the switching points during operation. Since the cover is plate glass, it acts as an excellent tape guiding surface without the need for additional coatings as typically are applied to metals. The transfer of light from the linear lamps through the vacuum chambers and to the photocells is done through clear glass plate to lessen light losses and provide high surface hardness reducing wear at the tape contact points. When tape is in the machine, it contacts only glass in the cover and hard anodized aluminum on the deck. Electrostatic charge buildup is thereby minimized, and dirt particles do not adhere well to the glass or metal. The vacuum chamber profile is molded into the cover, and no additional machining is required. A step 191 is introduced in order to assist the loading operation as shown in FIG. 8. At the end of fast wind, there is a loop of tape in one column (supply) but not in the other (take-up). When the reel motor is D.C. driven to load a loop into the takeup column, the cross-sectional area must be nearly the same as that seen by the supply loop, so the area above the stop 191 is expanded tomeet this need.

Figure 15:
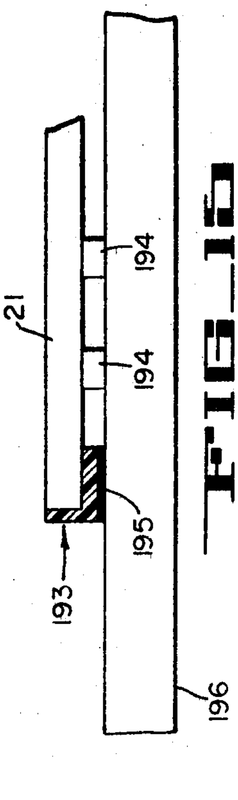
FIG. 15 is a broken away elevation view illustrating the manufacture of a portion of the apparatus of FIG. 1.

The deck is a flat, anodized aluminum plate which would be difficult to damage when servicing. If the chamber profile were machined in the deck, the glass, or other clear material for passing light through, would also have to be on deck; and one dropped screwdriver or other service tool might easily result in unreasonable repair costs and prevent operation of the machine until repairs are made. A dropped cover only means replacement of the cover, which is relatively low in cost, and, if spare parts are stored, no down time. The vacuum chamber height is extremely critical and is held to within ±0.0003 inches. This tolerance is nearly impossible to hold in clear materials even with epoxy castings, so a different technique is used, as illustrated in FIG. 15. The cover is cast in its profile as required, but deliberately undersized in chamber height. After the casting 193 has cured, an additional filler layer 195 of semi-flexible epoxy is applied; and the cover is held by spacers 194 a precise distance above a precision flat plate coated with teflon. The epoxy filler fills the space between the flat plate 196 and undercast cover profile 193. When cured, the cover is stripped from the flat plate 196; and any excess part of flexible epoxy 195 is trimmed away. The resulting cover is very accurate without the cost of the machining normally associated with these tolerances.

THE ELECTRONIC CIRCUITS

Except for the AB switch SWAB 167 (FIG. 7) all of the circuits on the B-side are exact counterparts of the A-side circuits; and besides the circuits already mentioned, include an amplifier AMPB 146, a switch SWBB 152, and a compensated amplifier CAMPB 154.

The error detectors 141 and 142 are of conventional design, and are arranged to provide an output signal to the controller 109 whenever the input signal voltage, representing the tape loop length, corresponds to a predetermined value. The value to be met and responded to is selected by the controller 109 by means of one or another of the circuits 143, 181, 187 for detector 141 and 144, 182, 188 for detector 142, all of which are of conventional design. The other switches and amplifiers are illustrated in detail in FIGS. 12–14, and are described as follows.

Figure 12:
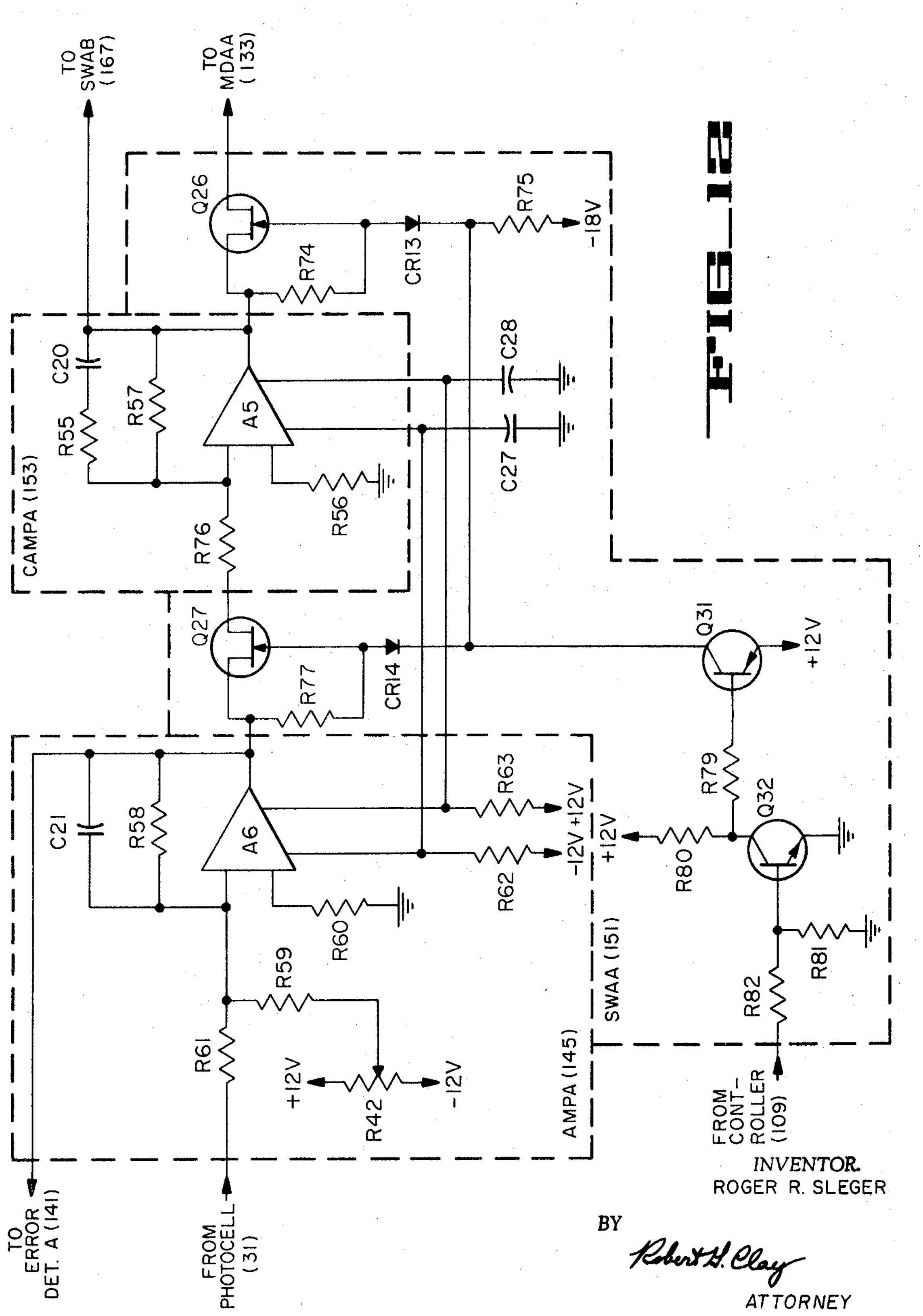
FIG. 12 is a schematic diagram of a portion of the circuits shown in FIG. 7.

The amplifier AMPA 145 comprises an amplifier A6 coupled as shown in FIG. 12 to the following circuit elements, having the values noted:

| | | |
|---|---|---|
| Resistor | **R42** | 5K ohms |
| Resistor | **R58** | 2.7M ohms |
| Resistor | **R59** | 2.7M ohms |
| Resistor | **R60** | 220 ohms |
| Resistor | **R61** | 220 ohms |
| Resistor | **R62** | 110 ohms |
| Resistor | **R63** | 110 ohms |
| Capacitor **C21** | | 22PF, 500 V |

The switch SWAA 151 comprises the following circuit elements, coupled as shown in FIG. 12, and having the values noted:

| | | |
|---|---|---|
| Resistor | R74 | 3.3M ohms |
| Resistor | R75 | 270K ohms |
| Resistor | R77 | 3.3M ohms |
| Resistor | R79 | 100K ohms |
| Resistor | R80 | 100K ohms |
| Resistor | R81 | 100K ohms |
| Resistor | R82 | 10K ohms |
| Capacitor | C27 | 4.7F, 35V |
| Capacitor | C28 | 4.7F, 35V |
| Diode | CR13 | 1N914 |
| Diode | CR14 | 1N914 |
| Transistor | Q26 | 2N2319 |
| Transistor | Q27 | 2N3819 |
| Transistor | Q31 | 2N2219 |
| Transistor | Q32 | 2N2219 |

The amplifier CAMPA 153 comprises an amplifier A5 coupled as shown in FIG. 12 to the following circuit elements, having the values noted:

| | | |
|---|---|---|
| Resistor | **R55** | 0.270K ohms |
| Resistor | **R56** | 1M ohms |
| Resistor | **R57** | 2.7M ohms |
| Resistor | **R76** | 2.7M ohms |
| Capacitor | **C20** | 0.082F, 50V |

Figure 13:
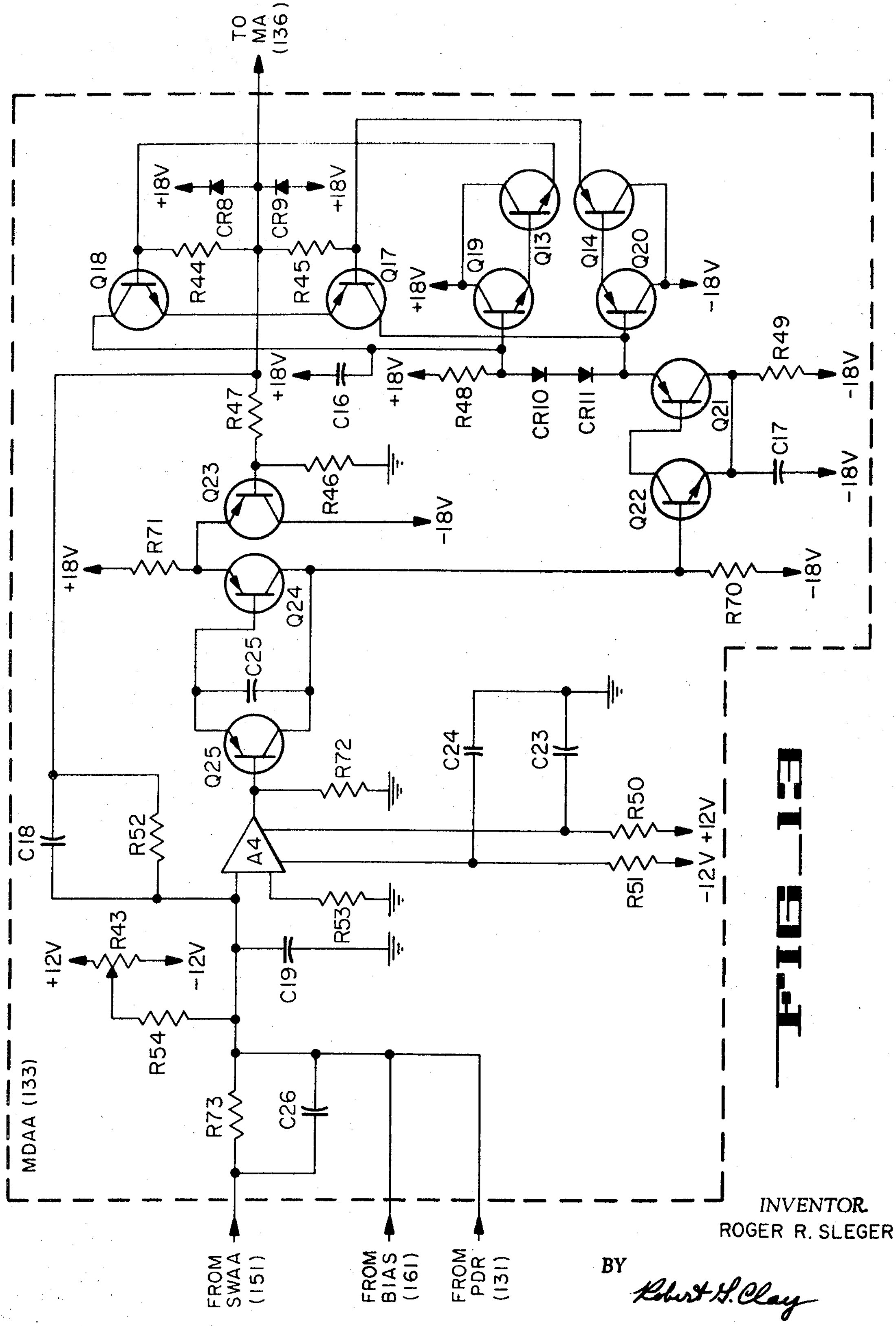
FIG. 13 is a schematic diagram of a portion of the circuits shown in FIG. 7.

The motor drive amplifier MDAA 133 comprises an amplifier A4 coupled as shown in FIG. 13 to the following circuit elements, having the values noted:

| | | |
|---|---|---|
| Resistor | **R43** | 5K ohms |
| Resistor | **R44** | 0.2 ohms, 2W |
| Resistor | **R45** | 0.2 ohms 2W |
| Resistor | **R46** | 560 ohms |
| Resistor | **R47** | 560 ohms |
| Resistor | **R48** | 820 ohms, 1W |
| Resistor | **R49** | 56 ohms, 1W |
| Resistor | **R50** | 110 ohms |
| Resistor | **R51** | 110 ohms |
| Resistor | **R52** | 1M ohms |
| Resistor | **R53** | 62K ohms |
| Resistor | **R54** | 330K ohms |
| Resistor | **R70** | 2.7K ohms |
| Resistor | **R71** | 12K ohms |
| Resistor | **R72** | 22K ohms |
| Resistor | **R73** | 120K ohms |
| Capacitor | **C16** | 3000 PF, 500V |
| Capacitor | **C17** | 1500 PF, 500 V |
| Capacitor | **C18** | 470 PF, 500V |
| Capacitor | **C19** | 0.15 F, 50V |
| Capacitor | **C23** | 4.7 F, 35V |
| Capacitor | **C24** | 4.7 F, 35V |
| Capacitor | **C25** | 200 PF, 500V |
| Capacitor | **C26** | 0.39 F, 59V |
| Diode | **CR8** | 1N4385 |
| Diode | **CR9** | 1N4385 |
| Diode | **CR10** | 1N914 |
| Diode | CR11 | 1N914 |
| Transistor | Q13 | 2N3715 |
| Transistor | Q14 | 2N3791 |
| Transistor | Q17 | 2N2905 |
| Transistor | Q18 | 2N2219 |
| Transistor | Q19 | 2N4921 |
| Transistor | Q20 | 2N4918 |
| Transistor | Q21 | 2N2905 |
| Transistor | Q22 | 2N2219 |
| Transistor | Q23 | 2N2905 |
| Transistor | Q24 | 2N2905 |
| Transistor | Q25 | 2N2905 |

Figure 14:
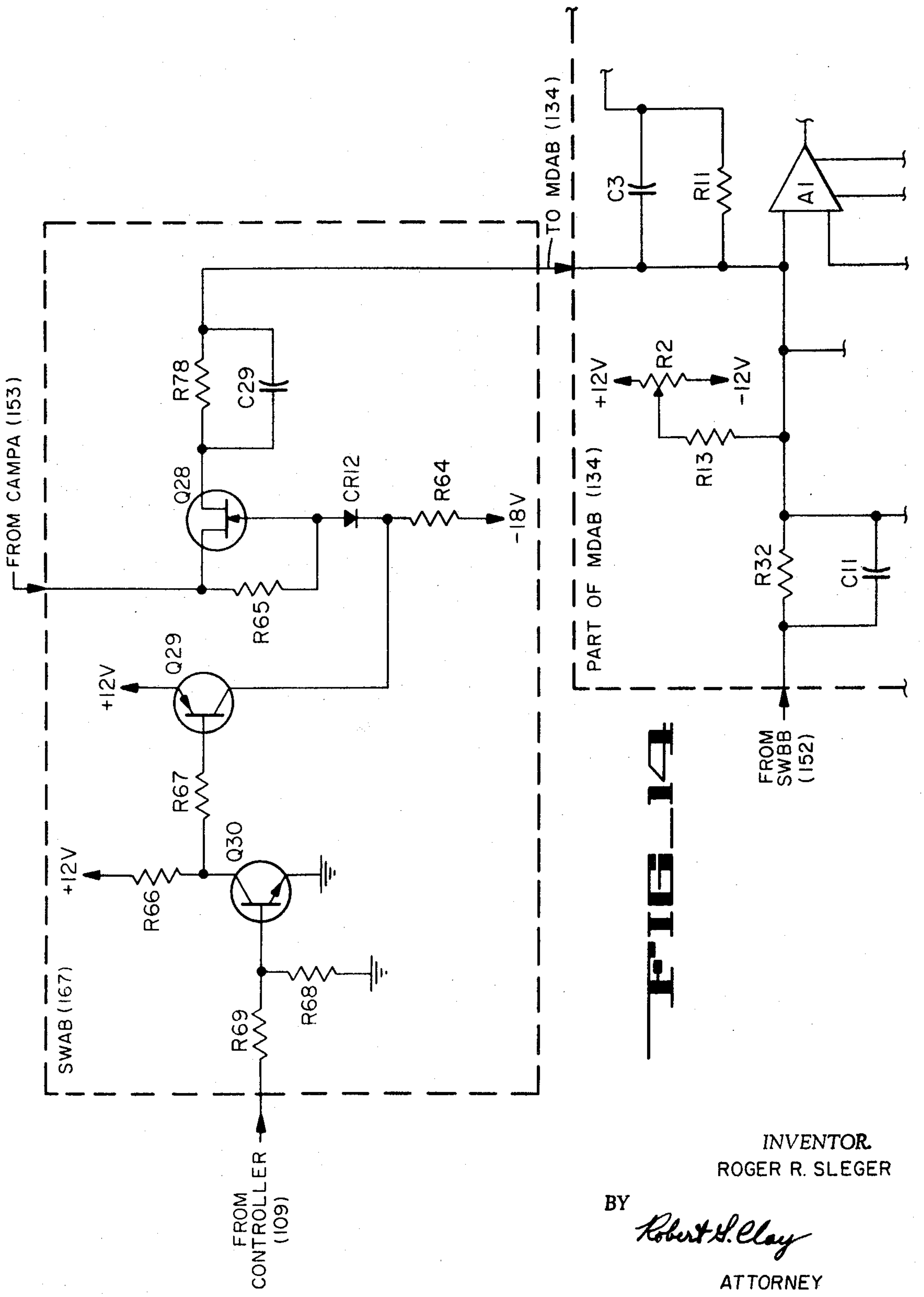
FIG. 14 is a schematic diagram of a portion of the circuits shown in FIG. 7.

The switch SWAB 167 comprises the following circuit elements coupled as shown in FIG. 14, and having the values noted:

| | | |
|---|---|---|
| Resistor | **R64** | 270K ohms |
| Resistor | **R65** | 3.3M ohms |
| Resistor | **R66** | 100K ohms |
| Resistor | **R67** | 100K ohms |
| Resistor | **R68** | 100K ohms |
| Resistor | **R69** | 10K ohms |
| Resistor | **R78** | 120K ohms |
| Capacitor | **C29** | 0.39F, 50V |
| Diode | **CR12** | 1N914 |
| Transistor | **Q28** | 2N3819 |
| Transistor | **Q29** | 2N2905 |
| Transistor | **Q30** | 2N2219 |

While as previously explained, the elements A1, R11, R2, R13, R32, C3 and C11, shown as parts of a fragment of MDAB 134 in FIG. 14, are counterparts in value and coupling to corresponding parts of MDAA 133.

Thus there has been described a magnetic tape transport having a pair of tape loop vacuum columns on either side of a capstan, and a pair of flanking heads, the columns being tapered so that with increasing loop length, an increasing cross sectional area tape is exposed to vacuum, counteracting the drag of the heads, and no pinch roller is needed with the capstan. In fast wind mode, only one of the vacuum columns is used, and a single loop length sensing apparatus controls both reel motors, which are biased such that the supply reel tries to make the loop longer than a desired mean length and the takeup reel tries to make the loop shorter than the mean, resulting in use of the reel motors at fullest capacity without danger of loss of control. An automatic cassette loader is also provided together with circuitry adapting the apparatus for automatic high speed recording of cassets.

What is claimed is:

1. In a magnetic tape transport of the type including a pair of reels, at least one capstan, at least one transducing head adjacent the capstan, a pair of differential pressure columns adjacent the reels, the improvement comprising:

means associated with said differential pressure columns for producing tape tension increasing with loop length throughout the operating length of the column; and means for sensing the tape loop lengths in each of said columns and controlling the corresponding reel so as to maintain a predetermined operating length of tape loop in said column.

2. The combination recited in claim 1, wherein:

said tension-producing means includes means causing increased bleeding of air past the loop in each column when said loop is adjacent the loop entrance end of the column, so that the differential vacuum pressure is of smaller value when the loop is near the entrance end; and fast wind means are provided including means for causing unwinding of but one of said reels to feed tape into but one of said columns;

said capstan being provided with a non-slip surface and being located between said columns, so that said tape fed by the unwinding of but said one reel tends to load only into the column on the same side as said one reel;

said tension-producing means cooperating with said tape feeding means to ensure the loading of said one column only.

3. The combination recited in claim 2, wherein:

said fast wind means includes a motor for each reel;

said sensing and control means includes fast wind servo means arranged to increase and decrease the taking-up energization of the take-up reel motor with increasing and decreasing loop length, respectively, in said one column, and to concurrently decrease and increase, respectively, the holding-back energization of the supply reel motor;

said sensing and control means including means for applying a bias to each of said motors, said sensing and control means producing variable error signals dependent upon loop length to control said motors; provide the locations of the loop in said one column wherein the signals to said motors povide zero error motor reversing points being spaced apart for a substantial predetermined distance in said one column, with the reversing point for said take-up reel motor being at shorter loop length than the reversing point for said supply reel motor.

4. In a magnetic tape transport of the type including a pair of reels and motors therefor, and at least one tape loop differential vacuum pressure column adjacent one of the reels, a fast winding combination comprising:

means for sensing the length of the loop in said one column and for controlling said reel motors so as to urge the upstream reel to maintain a long loop and the downstream reel to maintain a short loop in said one column;

said sensing and control means including fast wind servo means arranged to increase and decrease the taking-up energization of the take-up reel motor with increasing and decreasing loop length, respectively, in said one column, and to concurrently decrease and increase, respectively, the holding-back energization of the supply reel motor;

said sensing and control means including means for applying a bias to each of said motors, said sensing and control means producing variable error signals dependent upon loop length to control said motors;

wherein the signals to said motors provide zero error motor reversing points being spaced apart for a substantial predetermined distance in said one column, with the reversing point for said take-up reel motor being at shorter loop length than the reversing point for said supply reel motor;

whereby the loop is maintained at an intermediate length, while the motors are worked at fullest capacity.

5. The combination recited in claim 1, wherein:

said transport is arranged for bi-directional play-record operation; and the at-rest lengths of the respective tape loops are shorter than operating length in the downstream column and longer than operating length in the upstream column;

said tension producing means including means to produce differing tensions in said columns when said tape loops have said predetermined operating lengths;

said differing tensions being preselected at values such that the frictional drag of said tape at said heads is compensated and the tape tensions immediately upstream and downstream from said capstan are equal.

6. The combination recited in claim 5, wherein:

said tension producing means for said columns include tapering side walls for said columns, converging from the low-pressure ends thereof toward the tape loop ends;

the taper angle of said vacuum column side walls, and the gain of said loop length sensing and control means, being preselected in relation to one another to precisely compensate said frictional drag at said heads.

7. The combination recited in claim 6, wherein:

a motor is provided for each reel;

said sensing and control means includes operating servo means arranged to increase and decrease the taking-up energization of the take-up reel motor and the holding-back energization of the supply reel motor with increasing and decreasing loop length, respectively, in the take-up and supply columns;

said sensing and control means including means for applying a bias to each of said motors, said sensing and control means producing variable error signals dependent upon loop length to control said motors;

the locations of the loops in said columns wherein the signals to said motors provide zero error motor reversing points being at short loop lengths in each column.

8. In a magnetic tape transport of the type including a pair of reels, a pair of motors therefor, at least one capstan, at least one transducing head on either side of the capstan, and a pair of differential pressure columns adjacent the reels, the combination comprising:

a controller operable to feed tape from one of said reels into the corresponding column for fast wind mode;

tape loop length sensing means for each of said columns, said means being coupled to said controller for transmitting said sensing thereto;

means conditioned by said controller to arrange the sensing means for said one column to sense the arrival of the loop in said one column at a predetermined medium length and to notify said controller;

means conditioned by said controller to operate said sensing means and reel motors in said fast wind mode such that the supply reel is urged to maintain a long length loop and the take-up reel is urged to maintain a short length loop in said one column; and further means conditioned by said controller for stopping said motors when the loop length in said one column becomes shorter than said short length as at the end of tape point.

9. The combination recited in claim 8 wherein:

means conditioned by said controller are provided for operating said motors to feed tape into both of said columns and to maintain said tape loops therein at a medium length in a stand-by mode.

10. The combination recited in claim 9, wherein:

means including servo means conditioned by said controller are provided to operate said capstan and motors in an operating mode such that the take-up loop is longer than the medium stand-by length and the supply loop is shorter than the medium stand-by length; and said differential pressure columns have side walls parallel to the axis of curvature of the loop therein and inclined toward one another at an angle tapering divergingly from the tape entrance and exit end of the column toward the low-pressure end of the column, the angle of taper being such that the frictional drag of said heads is precisely compensated by the difference in tensions produced in said loops at said operating lengths thereof in said tapered columns.

11. The combination recited in claim 10, wherein said controller is a digital computer programmed to condition and control said various means as recited.

12. The combination recited in claim 11, wherein said reels are part of a cassette unit mountable in said an SWS switch positioned for engagement by said rack and providing a signal to said controller when said rack is the operational position;

an SWD switch providing a signal to said controller when said rack meets opposition in movement toward said operational position;

an SWU switch providing a signal to said controller when said rack meets opposition in movement away from said operational position;

a motor for said rack and a tri-stable holding circuit conditioned by said controller for selective operating said motor in either directions, and for stopping said motor.

15. The combination as recited in claim 14 and also including a stop mode means termed STOP, a bi-stable holding circuit termed BSH, and a record mode means termed REC all within said controller, and a load switch termed LOAD, said photosensing element being termed PC, said tri-stable holding circuit being termed TSH, and the controller being programmed to provide the following conjunctive function modes, wherein "0" means "not operating," "1" means "operating," "+" means "moving away from operating position" and "—" means "moving toward operating position":

| | | | | | | | Controller | | |
|---|---|---|---|---|---|---|---|---|---|
| Mode | Load | SWD | SWU | TSH | SWS | PC | BSH | REC | Stop |
| STANDBY | 0 | 1 | 0 | 0 | 1 | 1 | 0 | 0 | 0 |
| LOAD | 1 | 1 | 0 | + | 1 | 1 | 0 | 0 | 0 |
| UP | 1 | 0 | 0 | + | 0 | 0,1 | 0 | 0 | 0 |
| $\overline{\text{LOAD}}$ | 0 | 0 | 0 | — | 0 | 0,1 | 0 | 0 | 0 |
| LOAD | 1 | 0 | 0 | + | 0 | 0,1 | 0 | 0 | 0 |
| JAM | 1 | 0 | 1 | 0 | 0 | 0.1 | 0 | 0 | 0 |
| UP | 1 | 0 | 0 | + | 0 | 0,1 | 0 | 0 | 0 |
| TOP | 1 | 0 | 1 | 0 | 0 | 1 | 0 | 0 | 0 |
| TOP | 1 | 0 | 1 | 0 | 0 | 0 | 1 | 0 | 0 |
| DOWN | 0 | 0 | 1 | — | 0 | 0,1 | 1 | 0 | 0 |
| DOWN | 0 | 0 | 0 | — | 0 | 0,1 | 1 | 0 | 0 |
| JAM | 0 | 1 | 0 | + | 0 | 0,1 | 1 | 0 | 0 |
| DOWN | 0 | 0 | 0 | — | 0 | 0,1 | 1 | 0 | 0 |
| BOTTOM | 0.1 | 1 | 0 | 0 | 1 | 1 | 1 | 1 | 0 |
| STOP | 0,1 | 1 | 0 | 0 | 1 | 1 | 1 | 1 | 1 |
| EJECT | 0,1 | 1 | 0 | + | 1 | 1 | 1 | 0 | 1 |
| EJECT | 0,1 | 0 | 0 | + | 0 | 0,1 | 1 | 0 | 1 |
| EJECT | 0,1 | 0 | 1 | 0 | 0 | 0 | 1 | 0 | 1 |
| DOWN | 0 | 0 | 1 | — | 0 | 1 | 0 | 0 | 0 |
| DOWN | 0 | 0 | 0 | — | 0 | 0,1 | 0 | 0 | 0 |
| STANDBY | 0 | 1 | 0 | 0 | 1 | 1 | 0 | 0 | 0 |

transport, and cassette loading and unloading means are provided to include:

a pair of spindles extending from said reel motors for mounting said cassette reels in operating relation with said differential pressure columns;

a rack for holding said cassette in operating relation with said spindles, said rack being mounted for lateral tilting motion toward and away from said spindles to impale and remove said cassette on and from said spindles;

said rack having an upwardly opening side in the position laterally tilted away from said spindles, for manual insertion and removal of said cassette.

13. The combination recited in claim 12, wherein;

a housing is provided for said transport and is provided with an opening coinciding with said side of said rack for access of and to said cassette;

said housing also being provided with a swinging cover door coupled to said rack for closing said housing opening in the operating position of said rack and for clearing said housing opening in the tilted position of said rack.

14. The combination recited in claim 13, wherein: said transport is also provided with:

a photosensing element providing a signal to said controller when said cassette is in said rack in the tilted-up position;

16. The combination recited in claim 15, wherein:

said cassette reels are provided with hubs having an even number of keying lugs projecting radially inwardly;

said spindles being formed with concial tips and a pair of diametrically opposite axially directed grooves for engaging a corresponding pair of said lugs;

the sides of said spindles being cut away to avoid engagement with the remaining keying lugs.

17. The combination recited in claim 2, wherein said means causing increased bleeding of air past the loop in each column comprises a portal for said column defined by:

a pair of spaced parallel plates; and a pair of curved tape guides bracketed by said threshold plates;

said guides having bevelled edges such that atmospheric air passes freely between the tape and the bevelled edges whenever the tape loops are not touching the side walls of the column that are parallel to the tape width.

18. The combination recited in claim 1 wherein said differential pressure columns are defined by:

a precision flat plate; and a cover element having a recess formed therein facing said precision flat plate and shaped to the shape of said columns;

said cover element being formed at least in part, adjacent said precision flat plate, of first cast and molded substance having an undersized dimension normal to said precision flat plate;

the intervening space being filled by second cast and molded substance to form a sealed chamber with said precision flat plate.

* * * * *